F. W. BURNETT.
TRUING ATTACHMENT FOR LATHES.
APPLICATION FILED APR. 17, 1917.
1,265,423.
Patented May 7, 1918.
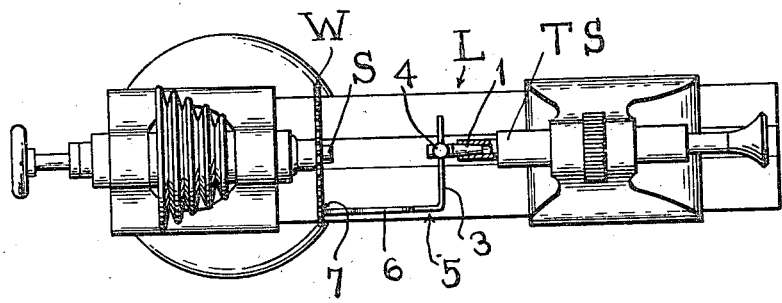
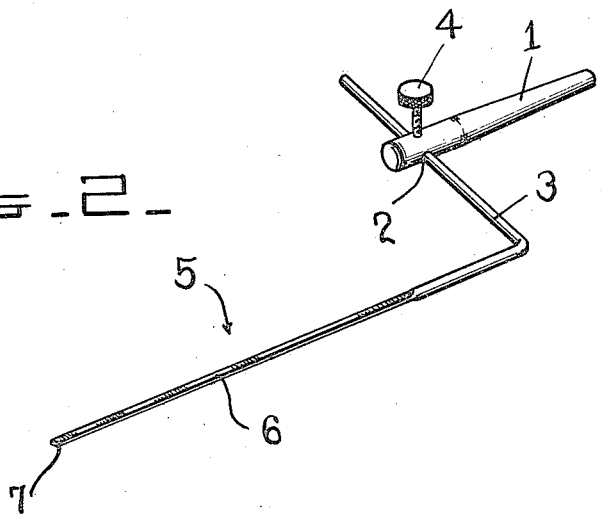
INVENTOR
Fred W. Burnett
WITNESSES
BY
ATTORNEY

UNITED STATES PATENT OFFICE.

FRED W. BURNETT, OF SHINNSTON, WEST VIRGINIA.

TRUING ATTACHMENT FOR LATHES.

1,265,423.

Specification of Letters Patent.

Patented May 7, 1918.

Application filed April 17, 1917. Serial No. 162,791.

*To all whom it may concern:*

Be it known that I, FRED W. BURNETT, a citizen of the United States, residing at Shinnston, in the county of Harrison and State of West Virginia, have invented certain new and useful Improvements in Truing Attachments for Lathes, of which the following is a specification.

This invention relates to truing attachments for lathes, and the object thereof is to provide a simply constructed and efficient attachment of this character which will take the place of an ordinary truing caliper and yet may be used for truing various kinds of wheels.

Another object is to provide a device for the use of watch makers and watch repairers for truing balance wheels—that is to say—for permitting the detection of any deviation on the rim of the balance wheel from a plane at right angles to its axis of rotation and locating the defect, to the end that the same may be corrected by bending the balance wheel where required.

Another object is to provide an attachment of this character, the indicator of which is so tempered and ground that it will be heard as well as seen when it comes in contact with high places on the wheel in connection with which it is to be used.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a top plan view of a lathe equipped with this improved attachment shown in operative position, and Fig. 2 is a detail perspective view of the attachment detached.

In the embodiment illustrated, a lathe L of ordinary construction is shown having the usual tail stock TS and wheel supporting spindle S. This lathe constitutes no part of the invention and hence will not be further described in detail.

The truing attachment constituting the invention comprises a chuck 1, which tapers slightly toward its rear end and is designed to be inserted in a correspondingly shaped socket in the tail stock TS of the lathe, as is shown clearly in Fig. 1. This chuck 1 has a bore 2 extending transversely therethrough in which is designed to be mounted one arm of an L-shaped indicator 5, said arm 3 being shown in the form of a rod extending through said bore 2 and clamped to the chuck by means of a set screw 4 which passes through the chuck in a plane at right angles to the bore 2 as is shown clearly in Fig. 2 to provide for the attachment of the indicator.

The long arm 6 of the indicator 5 is flattened throughout the greater portion of its length, being composed of highly tempered steel, and of a thinness sufficient to cause it to produce a sound when the terminal 7 thereof engages a projection on the wheel W being trued.

This long arm 6 of the indicator constitutes the index arm thereof and as above described is rendered extremely sensitive by grinding it very thin and tempering it highly. By so forming this index arm, when the terminal thereof engages the high places or projections on the face of the wheel W in contact with which it is traveling, it will not only bend and will be thus visible to the eye, but will produce a sound which will attract the ear of the operator as well, and indicate to him that the wheel is defective at this point.

It will thus be seen that this truing device may be used not only in the capacity of an ordinary truing caliper, but that it has a far greater range, and is applicable for truing up not only balance wheels, but all classes of watch and clock wheels.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

An attachment of the class described comprising a chuck tapered toward one end and adapted to be inserted in the tail stock of a lathe, said chuck having a bore extending transversely therethrough, an L-shaped indicator having its short arm in the form of a round rod passed through the bore in said chuck, a set screw intersecting said bore and adapted to clampingly engage said indicator arm and hold it in adjusted position relatively to the chuck, the long arm of said indicator being flattened and thinned to render it flexible and yieldable when the free end thereof is engaged with an obstruction.

In testimony whereof I affix my signature in presence of two witnesses.

FRED W. BURNETT.

Witnesses:
 MUTA U. SWIGER,
 W. RAY LEUG.

Copies of this patent may be obtained for five cents each, by addressing the "Commissioner of Patents, Washington, D. C."